(12) United States Patent
Miyamoto

(10) Patent No.: US 6,520,204 B2
(45) Date of Patent: Feb. 18, 2003

(54) FLUID SUPPLY APPARATUS

(75) Inventor: Michikazu Miyamoto, Noda (JP)

(73) Assignee: SMC Kabushiki Kaisha, Tokyo (JP)

( * ) Notice: Subject to any disclaimer, the term of this patent is extended or adjusted under 35 U.S.C. 154(b) by 12 days.

(21) Appl. No.: 09/906,847

(22) Filed: Jul. 18, 2001

(65) Prior Publication Data

US 2002/0011273 A1 Jan. 31, 2002

(30) Foreign Application Priority Data

Jul. 18, 2000 (JP) .......................................... 2000-217934

(51) Int. Cl.[7] .................................................. F16L 41/02
(52) U.S. Cl. ........................................................ 137/580
(58) Field of Search ........................................ 137/580

(56) References Cited

U.S. PATENT DOCUMENTS 3,019,813 A * 2/1962 Dommann ................... 137/580
3,391,706 A * 7/1968 Samson ....................... 137/580
3,814,130 A * 6/1974 Allen et al. .................. 137/580
3,913,470 A * 10/1975 Cullen .......................... 454/64
5,570,717 A * 11/1996 Stoll ............................. 137/580

FOREIGN PATENT DOCUMENTS

| JP | 1-150295 | 10/1989 |
| JP | 5-63679 | 9/1993 |

* cited by examiner

*Primary Examiner*—John Fox
(74) *Attorney, Agent, or Firm*—Paul A. Guss

(57) ABSTRACT

A port block, which is provided with an outlet port with a first end communicating with a fluid supply passage and with a second end communicating with the outside, is movably carried on a guide rail which is provided with an opening for making communication between the outside and the fluid supply passage formed in the longitudinal direction. A seal belt, which is engaged with an opening of the guide rail, is curved downwardly at the inside of the port block by the aid of an inner port cover which is arranged at the inside of the guide rail and an outer port cover which is arranged at the outside of the guide rail.

13 Claims, 20 Drawing Sheets

FLUID SUPPLY APPARATUS

BACKGROUND OF THE INVENTION

1. Field of the Invention

The present invention relates to a fluid supply apparatus. In particular, the present invention relates to a fluid supply apparatus comprising a port block which is movable along a guide rail having a fluid supply passages provided therein, wherein a fluid is supplied to the port block at an arbitrary position on the guide rail.

2. Description of the Related Art

A slide joint has been hitherto known as such a fluid supply apparatus. According to Japanese Laid-Open Utility Model Publication No. 1-150295, a slide joint includes a pipe provided with a long groove formed in the longitudinal direction of the pipe. A flexible seal belt is fitted to the long groove, and the seal belt is pressed by the internal pressure to close the long groove. Further, the slide joint includes a pressing member which penetrates through the long groove to separate the seal belt from the long groove. The pressing member is installed to the inner circumference of a cylindrical member which is externally fitted slidably with respect to the outer circumferential surface of the pipe. The cylindrical member has a gap centrally provided therein. Opposite ends of the cylindrical member are closed tightly.

In FIGS. 19 and 20, the conventional slide joint 1 comprises a pipe 2 having high rigidity, a flexible seal belt 4 fitted to a long groove 3 formed in the longitudinal direction of the pipe 2, a cylindrical member 5, and a pressing member 6. The cylindrical member 5 presses the seal belt 4 by the internal pressure to close the long groove 3. The cylindrical member 5 is slidably fitted to the outer circumferential surface of the pipe 2. The cylindrical member 5 has a gap centrally provided therein. Opposite ends of the cylindrical member 5 are closed tightly. The pressing member 6 is provided on the inner circumference of the cylindrical member 5 and penetrates through the long groove 3 to separate the seal belt 4 from the long groove 3.

The gap 7 is provided between the cylindrical member 5 and the outer circumference of the pipe 2. Further, packings 9 are installed to fitting sections 8 at the opposite ends of the cylindrical member 5. The packings 9 tightly contact with the outer circumferential surface of the pipe 2 so that the interior of the gap 7 is kept in an air-tight manner. Reference numeral 10 indicates a connector. A rubber hose 11 connected to an unillustrated spray gun is screw-fastened thereto.

As for the pressing member 6, the upper surface of a connecting section 12 penetrating through the long groove 3 is fixed by screws 13 to the inner circumferential surface of the cylindrical member 5. A pressing surface 14 is curved downwardly in parallel to the long groove 3 and formed on the lower surface of the connecting section 12. Guide surfaces 15 of the pressing surface 14 are separated from each other by the width of the seal belt 4 (see FIG. 20). A pair of support sections 16, 16 extend longitudinally on both sides of the pressing member 6. The support sections 16, 16 are joined to each other by joined sections 17, 17 at mutually corresponding forward ends respectively. An opening 18 is formed between the pressing member 6 and the joined section 17.

The slide joint 1 constructed as described above is used as follows. That is, when the cylindrical member 5 makes make sliding movement along the pipe 2, the seal belt 4 is interposed between the opposite ends of the cylindrical member 5 and the support sections 16 of the pressing member 6. The upper surface of the seal belt 4 is pressed by the pressing surface 14 of the pressing member 6, and it is separated from the long groove 3. Accordingly, the compressed air, which flows into the pipe 2, is fed via the opening 18 and the long groove 3, and it is supplied from the gap 7 to the rubber hose 11.

In the conventional slide joint 1 described above, the pressing member 6 is fitted and inserted into the long groove 3 to prevent the cylindrical member 5 from rotation. However, if the load in the circumferential direction is applied to the cylindrical member 5, the connecting section 12 of the pressing member 6 abuts against the inner surface of the long groove 3, and an excessive sliding friction is generated during the reciprocating movement of the cylindrical member 5. As a result, the cylindrical member 5 cannot make the reciprocating movement smoothly.

Further, it is difficult for the pressing member 6 to uniformly press the upper surface of the seal belt 4, due to the load applied to the cylindrical member 5. Thus, the seal belt 4 may not be deformed corresponding to the shape of the pressing surface 14. Therefore, the compressed air in the pipe 2 does not flow into the gap 7 of the cylindrical member 5, and the compressed air is not supplied to the rubber hose 11 under a predetermined condition.

Further, when the slide joint 1 is attached to a pneumatic pressure apparatus, additional parts for attaching the slide joint 1 and the pneumatic pressure apparatus are required, because the outer contour of the slide joint 1 is columnar. Therefore, the number of parts is increased, the structure is complicated, and the production cost is increased.

SUMMARY OF THE INVENTION

A general object of the present invention is to provide a fluid supply apparatus which has a simple structure, which favorably absorbs the load, and which makes it possible to reduce the production cost.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
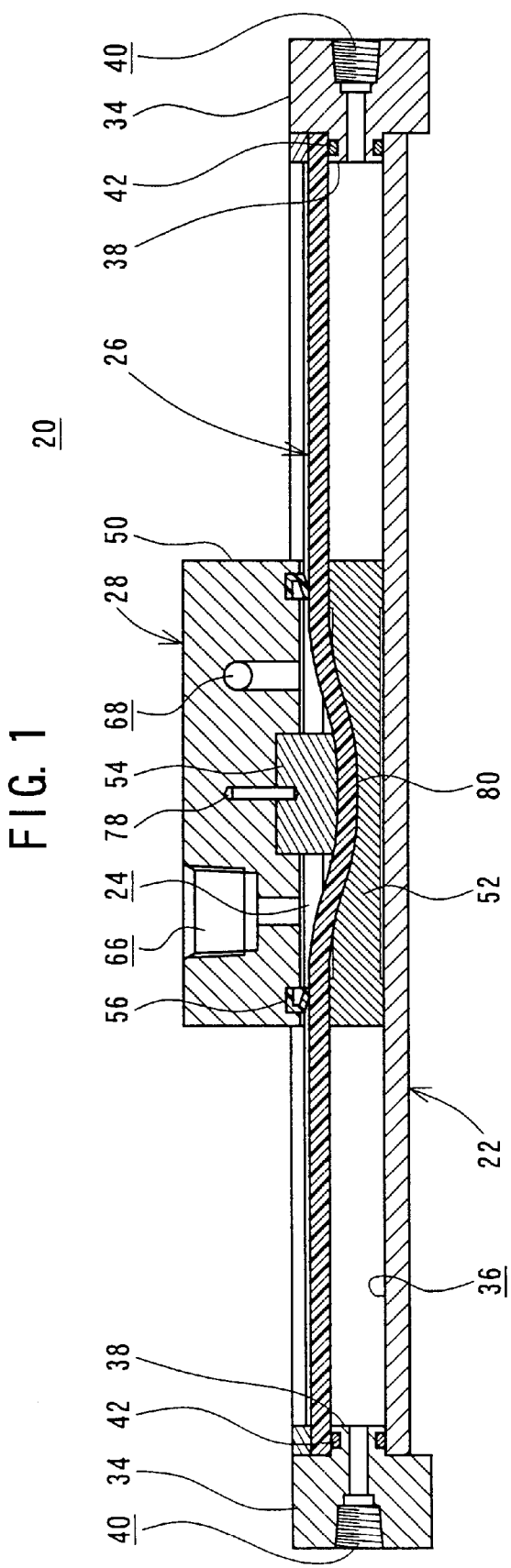
FIG. 1 shows a longitudinal sectional view taken along the axial direction of a fluid supply apparatus according to a first embodiment of the present invention.

An arrangement of a fluid supply apparatus 20 according to a first embodiment of the present invention is shown in FIGS. 1 to 7.

The fluid supply apparatus 20 basically comprises a guide rail 22 which is formed to have a substantially rectangular cross section, a seal belt 26 which is made of resin for closing an opening 24 formed in the axial direction on the upper surface of the guide rail 22, and a port block 28 which is movable along the opening 24.

Figure 2:
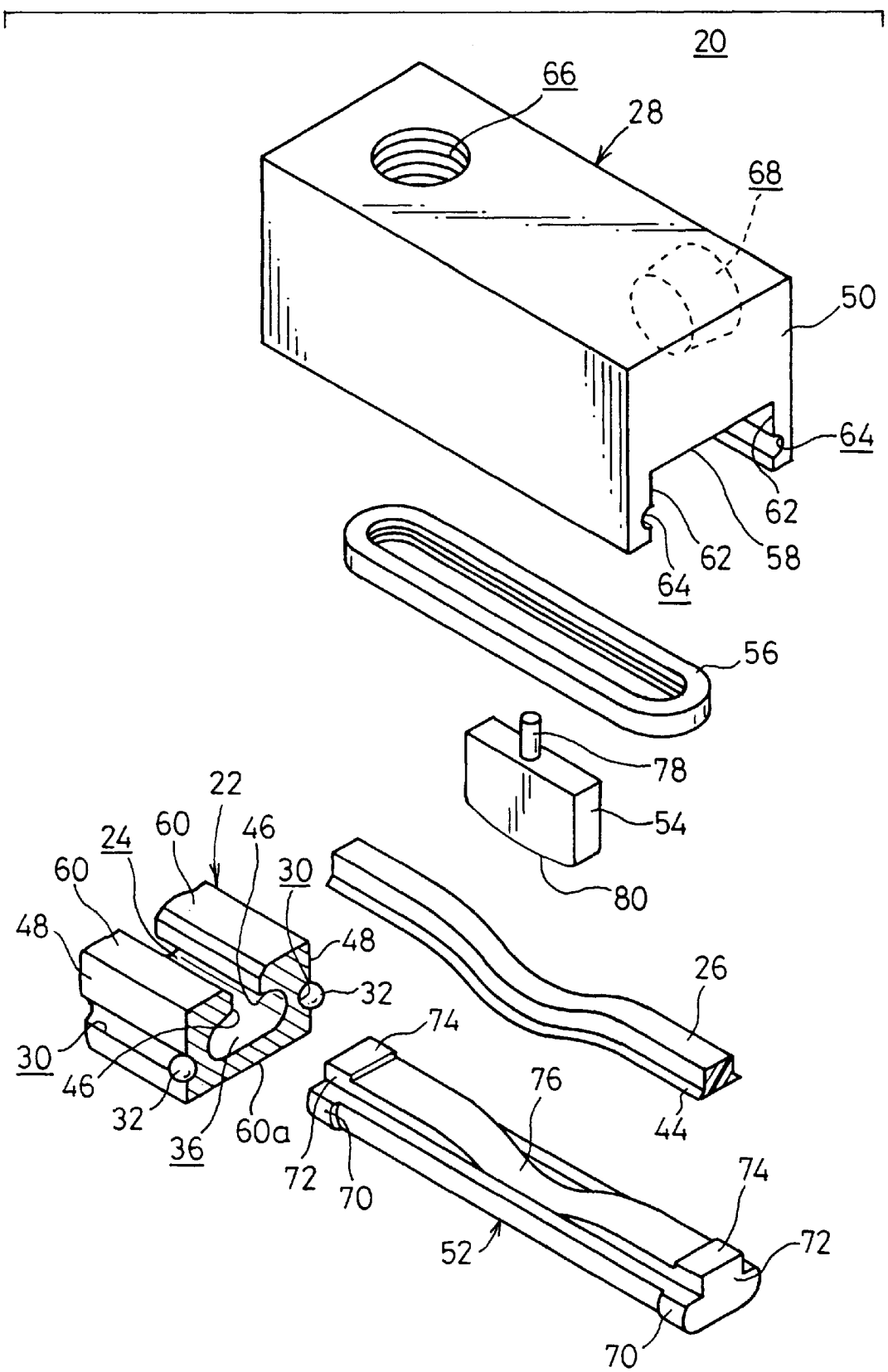
FIG. 2 shows, with partial omission, an exploded perspective view illustrating the fluid supply apparatus shown in FIG. 1.
Figure 3:
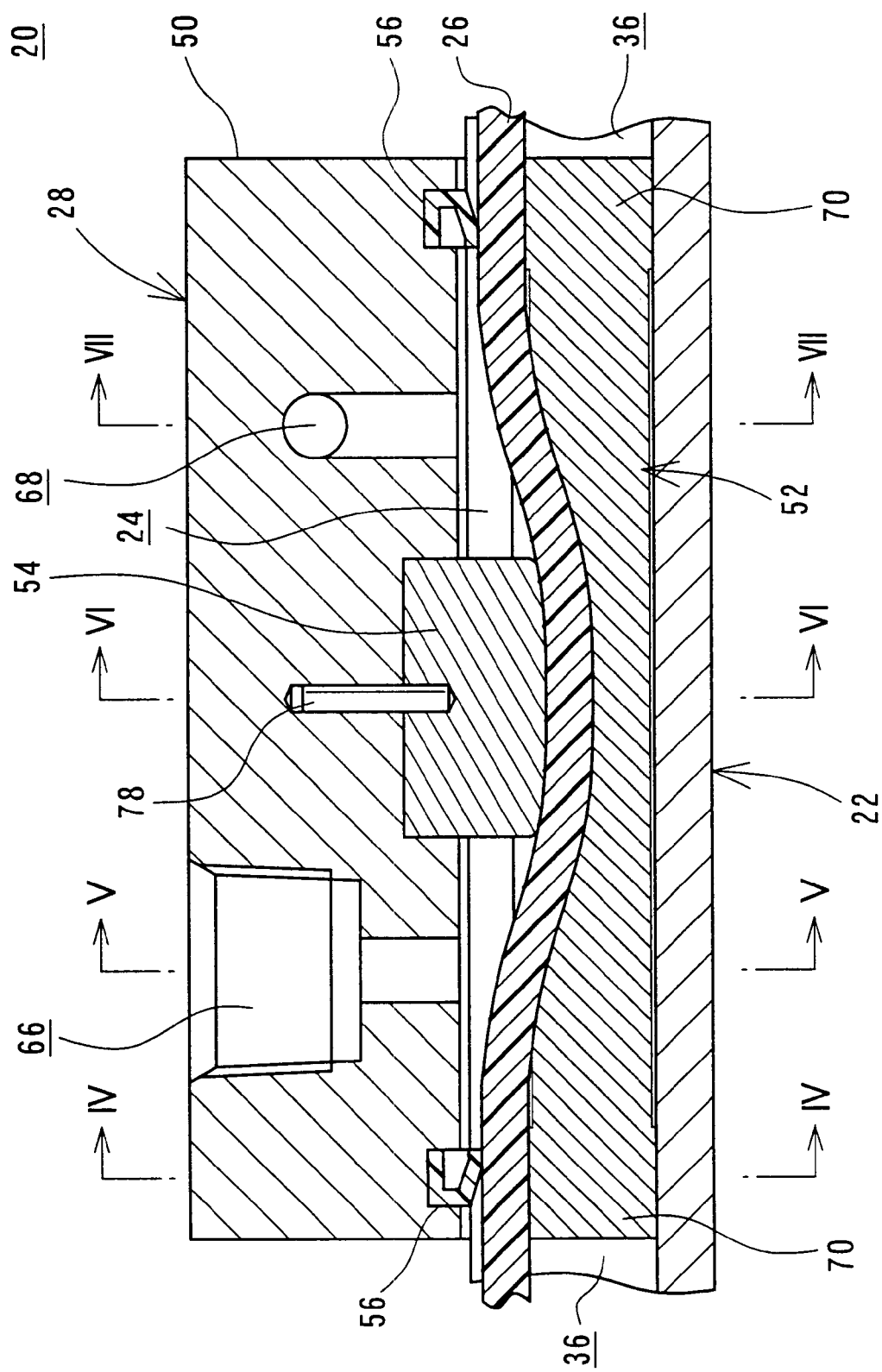
FIG. 3 shows a magnified vertical sectional view illustrating parts of the fluid supply apparatus shown in FIG. 1.

As shown in FIG. 2, the guide rail 22 is composed of, for example, an extruded material made of aluminum alloy having a certain wall thickness. The opening 24 is formed in the longitudinal direction of the guide rail 22. Ball-rolling grooves 30, each of which has a substantially C-shaped cross section, are formed on both of mutually opposing outer side surfaces 48 of the guide rail 22. Rolling members 32 such as balls are fitted into the ball-rolling grooves 30. The opening 24 is closed by a seal belt 26 of a band-shaped member. Further, as shown in FIG. 1, a pair of end covers 34 are provided as supply ports for the fluid at both end portions of the guide rail 22. Thus, a fluid supply passages 36 is defined in the guide rail 22.

In this embodiment, projections 38 of the end covers 34 are fitted to the both end portions of the guide rail 22, and thus the fluid supply passage 36 is closed. A fluid supply port 40, which communicates with the fluid supply passage 36, is provided for each of the end covers 34. The fluid flows from the first end cover 34 via the fluid supply passage 36 to the second end cover 34. A seal member 42 for making tight contact between the guide rail 22 and the end cover 34 is fitted into a groove provided on the outer circumference of each of the projections 38 of the end covers 34.

The seal belt 26 is formed so that the cross section, which is substantially perpendicular to the longitudinal direction, has a substantially rectangular configuration (see FIGS. 4 to 7). The seal belt 26 is formed of a flexible resin material in an integrated manner as a whole. A pair of lips 44, which are provided at lower portions of the seal belt 26, are engaged with chamfered sections 46 of the opening 24 respectively. A rectangular portion is inserted and fitted into the opening 24 (see FIG. 4). Both end portions of the seal belt 26 are fixed to the pair of end covers 34 connected to the guide rail 22 shown in FIG. 1 by applying an appropriate tension.

As shown in FIG. 2, the port block 28 comprises an outer port cover 50 which is carried on the guide rail 22, and an inner port cover 52 which has a shape corresponding to an inner surface shape of the fluid supply passage 36 of the guide rail 22 and which makes reciprocating movement in the fluid supply passage 36. The outer port cover 50 is provided with a pressing mechanism 54 for pressing the seal belt 26, and a seal member 56 which is installed to the outer port cover 50 by the aid of an unillustrated annular groove, for avoiding any leakage of the fluid from the fluid supply passage 36 by surrounding a part of the opening 24 corresponding to the portion of the outer port cover 50 respectively.

Further, a ceiling surface 58 of the recess of the outer port cover 50 and an upper surface 60 of the guide rail 22 are provided so that they are opposed to one another with a clearance intervening therebetween (see FIGS. 4 to 7). Ball-rolling grooves 64, which extend in the longitudinal direction, are bored at inner side surfaces 62 of the outer port cover 50. The rolling members 32 are fitted into the space between the ball-rolling grooves 64 and the ball-rolling grooves 30 of the guide rail 22. The outer port cover 50 is carried on the guide rail 22 so that the outer port cover 50 is movable along the guide rail 22 in accordance with the rolling action of the rolling members 32.

In this embodiment, the ball-rolling grooves 30, 64 and the rolling members 32 function as a load-absorbing mechanism for absorbing the load acting in the direction substantially perpendicular to the displacement direction when both of the inner and outer port covers 52, 50 make reciprocating movement in an integrated manner. The outer port cover 50 is provided with an outlet port 66 communicating with the ceiling surface 58 for supplying the fluid in the fluid supply passage 36 upwardly, and another outlet port 68 for supplying the fluid in the lateral direction respectively (see FIGS. 2, 5, and 7).

As shown in FIG. 2, both end portions of the inner port cover 52 are formed so that the outer circumferential surface of each of them is formed to have a shape which is substantially approximate to the inner surface shape of the fluid supply passage 36 of the guide rail 22. Guide sections 70, which are supported by the fluid supply passage 36, are internally provided at the both end portions so as to make reciprocating movement. A projection 72, which slightly protrudes toward the opening 24, is formed at an upper portion of the guide section 70 which faces the opening 24. A flat surface 74, with which the lower surface of the seal belt 24 makes joined contact, is provided for the projection 72. A curved attachment surface 76 is formed at a substantially central portion of the inner port cover 52. The seal belt 26 can be curved along the shape of the attachment surface 76 by pressing the seal belt 26 downwardly.

In this embodiment, the attachment surface 76 is formed to have a slight difference in height as compared with the flat surface 74. Therefore, the lower surface of the seal belt 26 is constructed so that it is smoothly moved along the attachment surface 76, while being held in a state of engagement with the flat surface 74.

As shown in FIG. 2, the pressing mechanism 54, which is engaged with the opening 24 of the guide rail 22, is provided on one side with a pin 78 to be fastened to the ceiling surface 58 of the outer port cover 50, and on the other side with a curved surface 80 to be engaged with the central portion of the attachment surface 76 of the inner port cover 52. In this arrangement, the seal belt 26 is pressed against the attachment surface 76 of the inner port cover 52 by means of the curved surface 80 of the pressing mechanism 54, and thus the seal belt 26 is successfully engaged along the curved configuration of the attachment surface 76 when the outer port cover 50 is moved.

The seal member 56 is formed to have a substantially elliptic configuration. The seal member 56 functions such that a part of the seal belt 26 is surrounded thereby between the upper surface 60 facing the opening 24 of the guide rail 24 and the ceiling surface 58 of the outer port cover 50 to avoid any leakage when the fluid in the fluid supply passage 36 is supplied to the outlet port 66, 68 of the outer port cover 50 (see FIGS. 2, 3, 5, and 7).

The both outer side surfaces 48 and the lower surface 60a except for the upper surface 60 of the guide rail 22 function as attachment surfaces for fixing the fluid supply apparatus 20 to another member.

The fluid supply apparatus 20 according to the first embodiment of the present invention is basically constructed as described above. Next, its operation, function, and effect will be explained.

As shown in FIGS. 2 to 7, the port block 28 comprises the outer port cover 50 and the pressing mechanism 54 which are connected to one another in an integrated manner by the aid of the pin 78. Further, the rolling members 32 are installed rollably between the ball-rolling grooves 64 of the outer port cover 50 and the ball-rolling grooves 30 of the guide rail 22. The seal belt 26, which faces the opening 24 of the guide rail 22, is interposed in a state of being curved downwardly by the aid of the pressing mechanism 54 and the inner port cover 52 installed to the fluid supply passage 36.

The seal belt 26 is curved downwardly when both of the inner and outer port covers 52, 50 are moved in an integrated manner along the guide rail 22 by the aid of the rolling members 32 and the ball-rolling grooves 30, 64. The fluid supply passage 36 of the guide rail 22 is in a state of communication with the outside by the aid of the outlet port 66 (68) provided for the outer port cover 50.

Therefore, the pressure fluid, for example, the compressed air in the fluid supply passage 36, which is fed via the fluid supply port 40, is supplied to the outside from the outlet port 66, 68 via the opening 24 by the aid of the inner port cover 52 and the seal belt 26.

Figure 4:
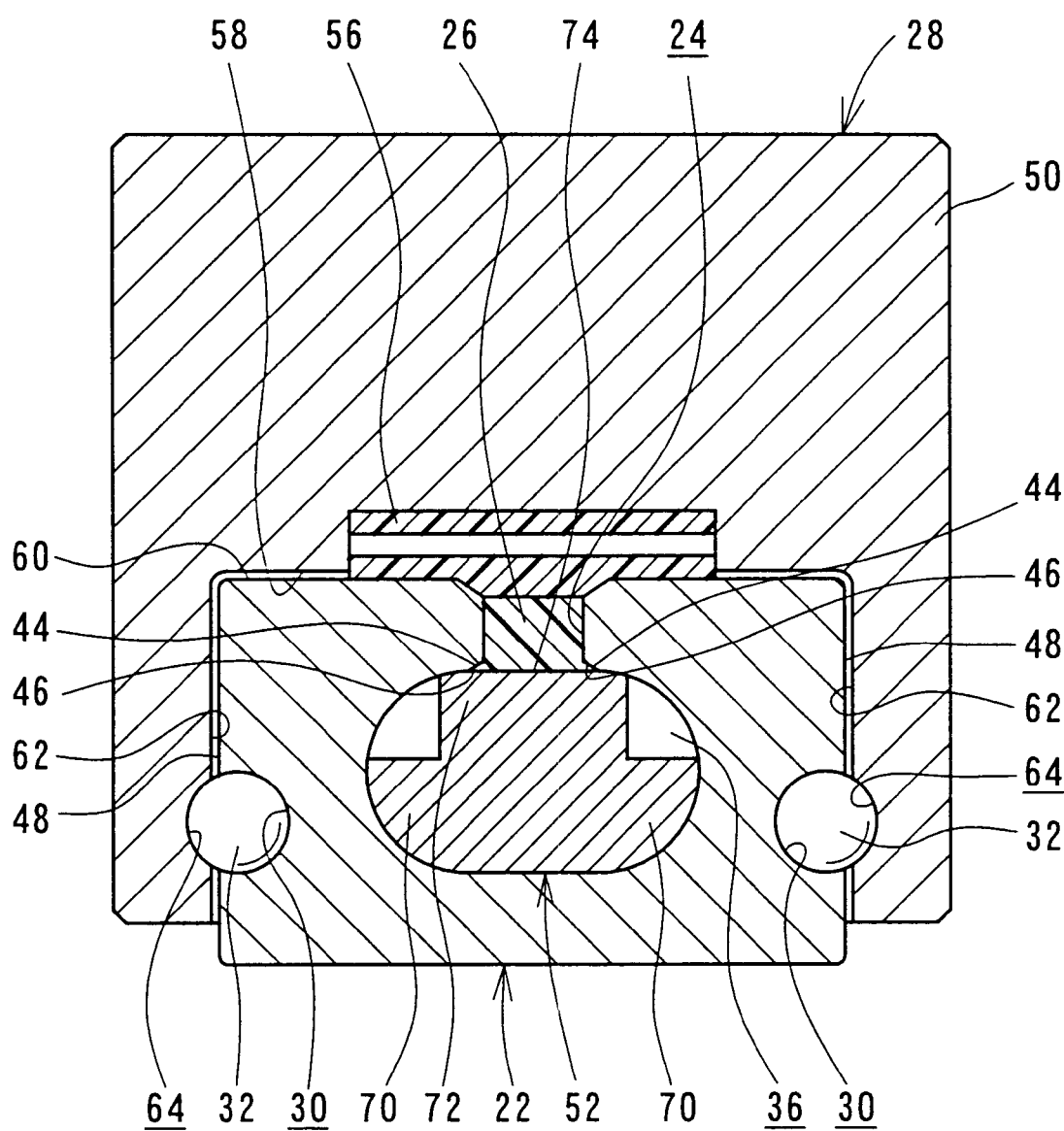
FIG. 4 shows a vertical sectional view taken along a line IV—IV shown in FIG. 3.
Figure 5:
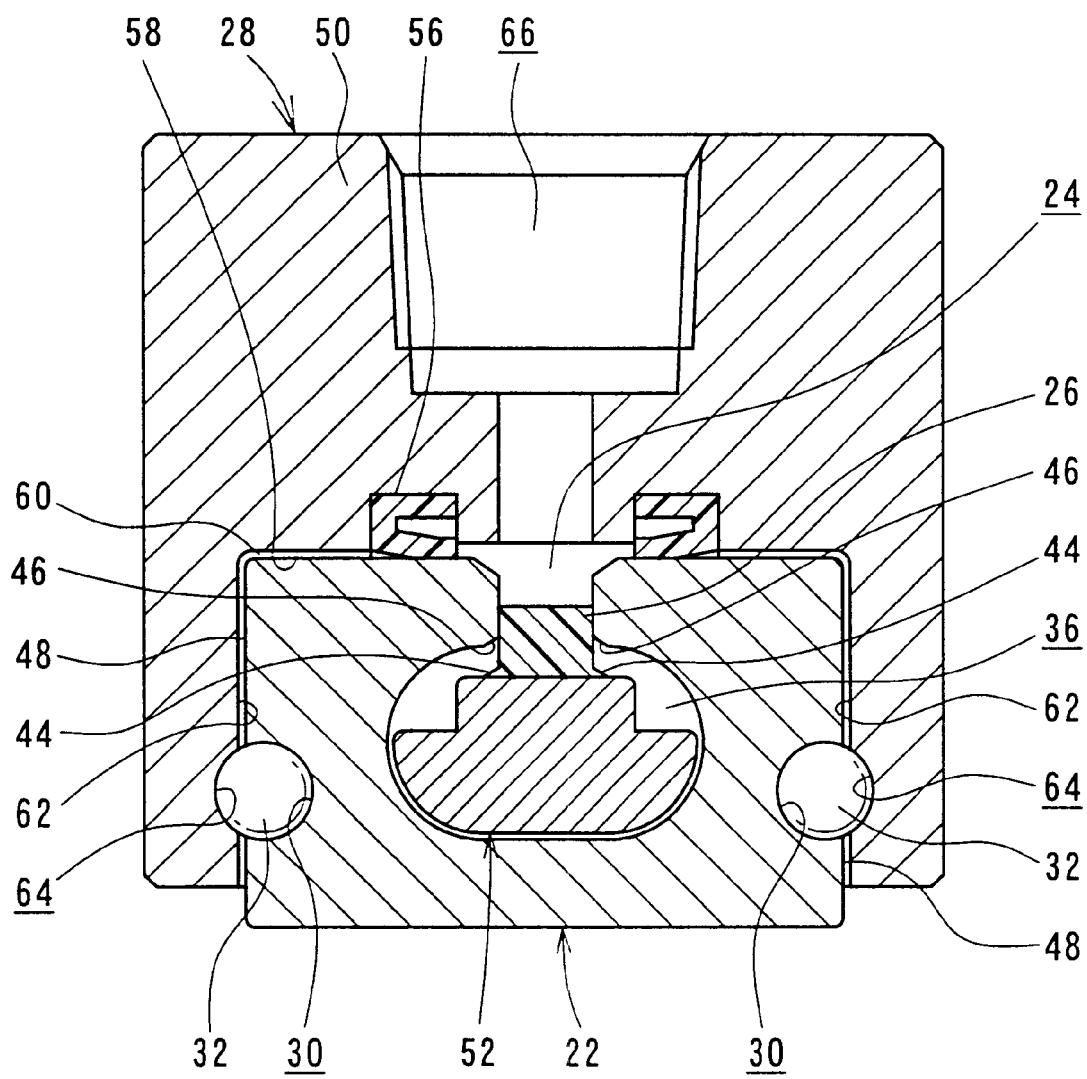
FIG. 5 shows a vertical sectional view taken along a line V—V shown in FIG. 3.
Figure 6:
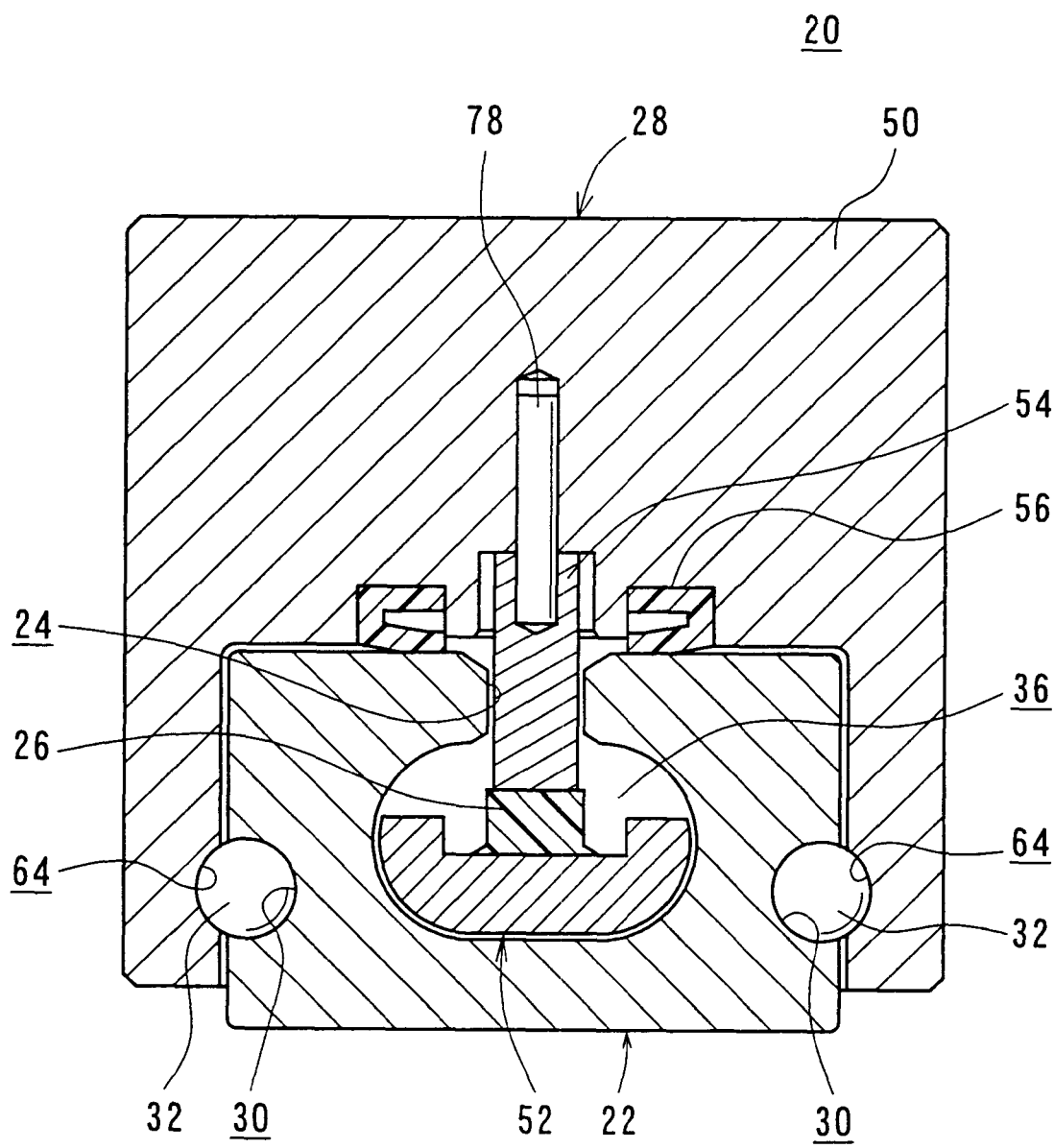
FIG. 6 shows a vertical sectional view taken along a line VI—VI shown in FIG. 3.
Figure 7:
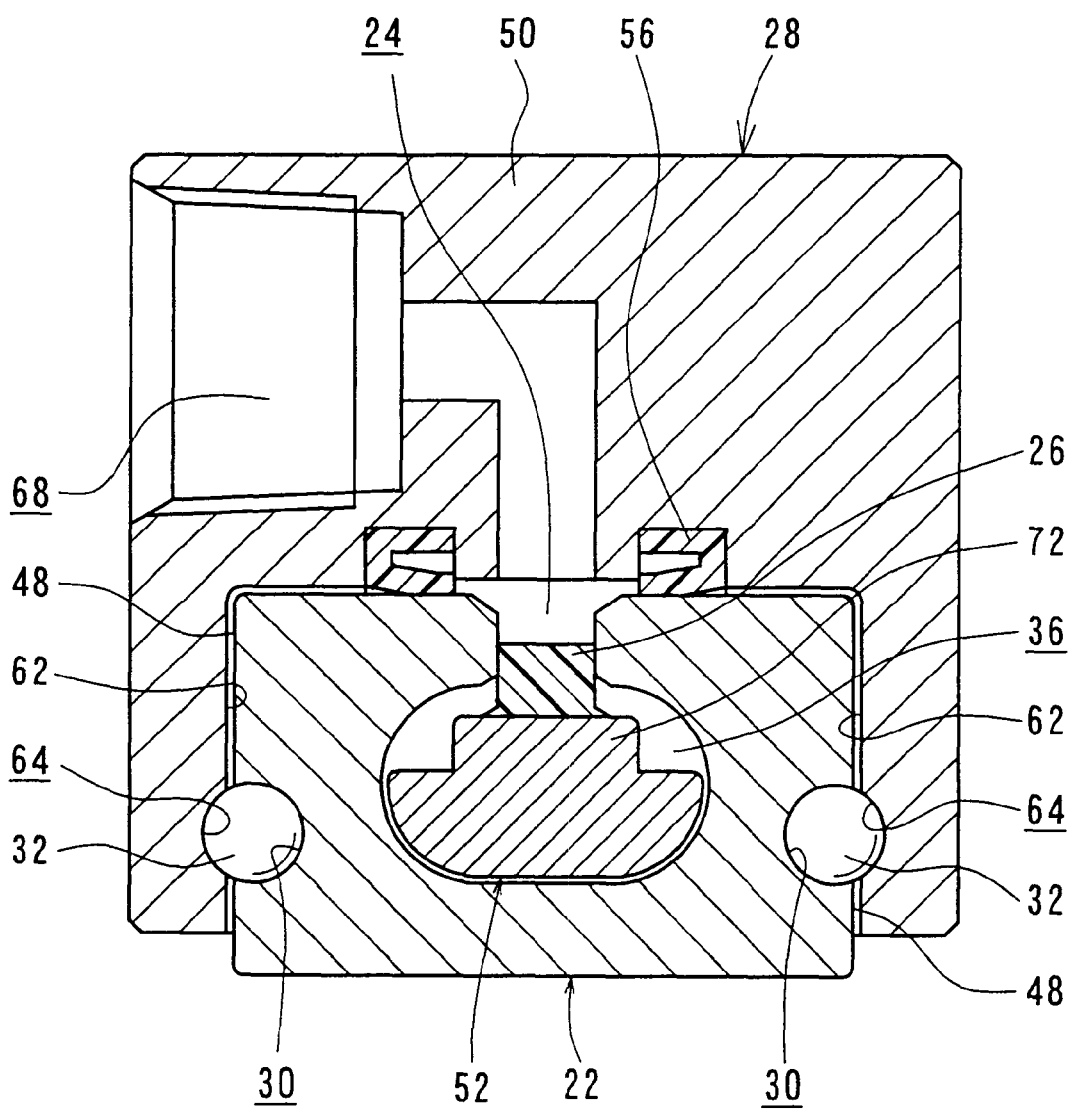
FIG. 7 shows a vertical sectional view taken along a line VII—VII shown in FIG. 3.

In this arrangement, as shown in FIG. 4, only the guide sections 70 of the inner port cover 52 contacts with the inner wall surface of the fluid supply passage 36.

Therefore, it is possible to suppress the sliding friction of the inner port cover 52 with respect to the fluid supply passage 36. Further, an operator can quickly move the outer port cover 50 to an arbitrary position on the guide rail 22 in accordance with the rolling action of the rolling members 32 which are fitted into the ball-rolling grooves 30, 64, for example, by means of manual operation of the operator.

Further, the seal belt 26 is curved downwardly by the aid of the inner port cover 52 and the pressing mechanism 54, and thus the communicating passage between the opening 24 and the fluid supply passage 36 can be sufficiently opened and maintained. Therefore, it is possible to supply the fluid to the outside from the outlet port 66 (68) without significant loss due to the flow passage resistance.

Figure 8:
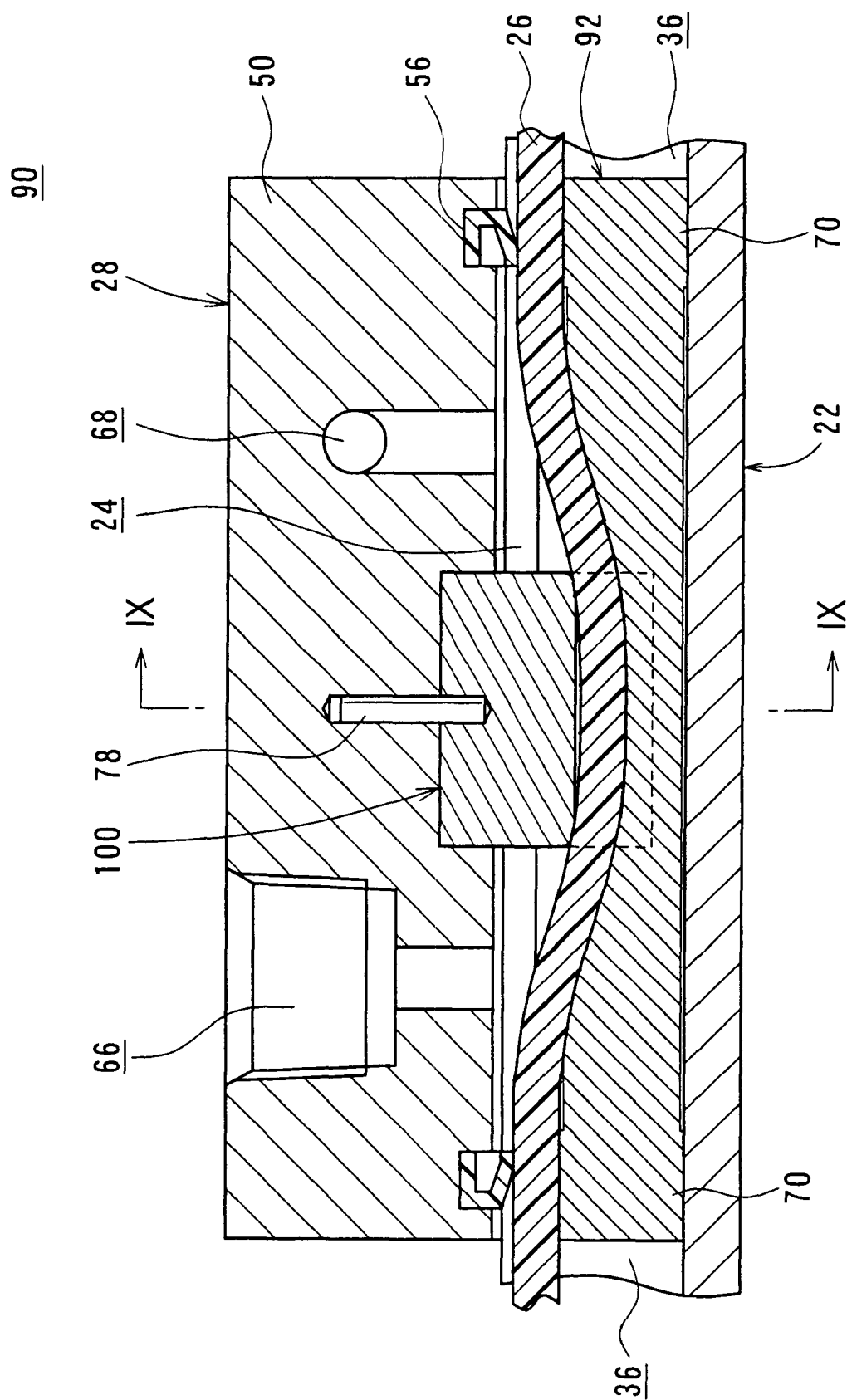
FIG. 8 shows, with partial omission, a longitudinal sectional view illustrating a fluid supply apparatus according to a second embodiment of the present invention.
Figure 9:
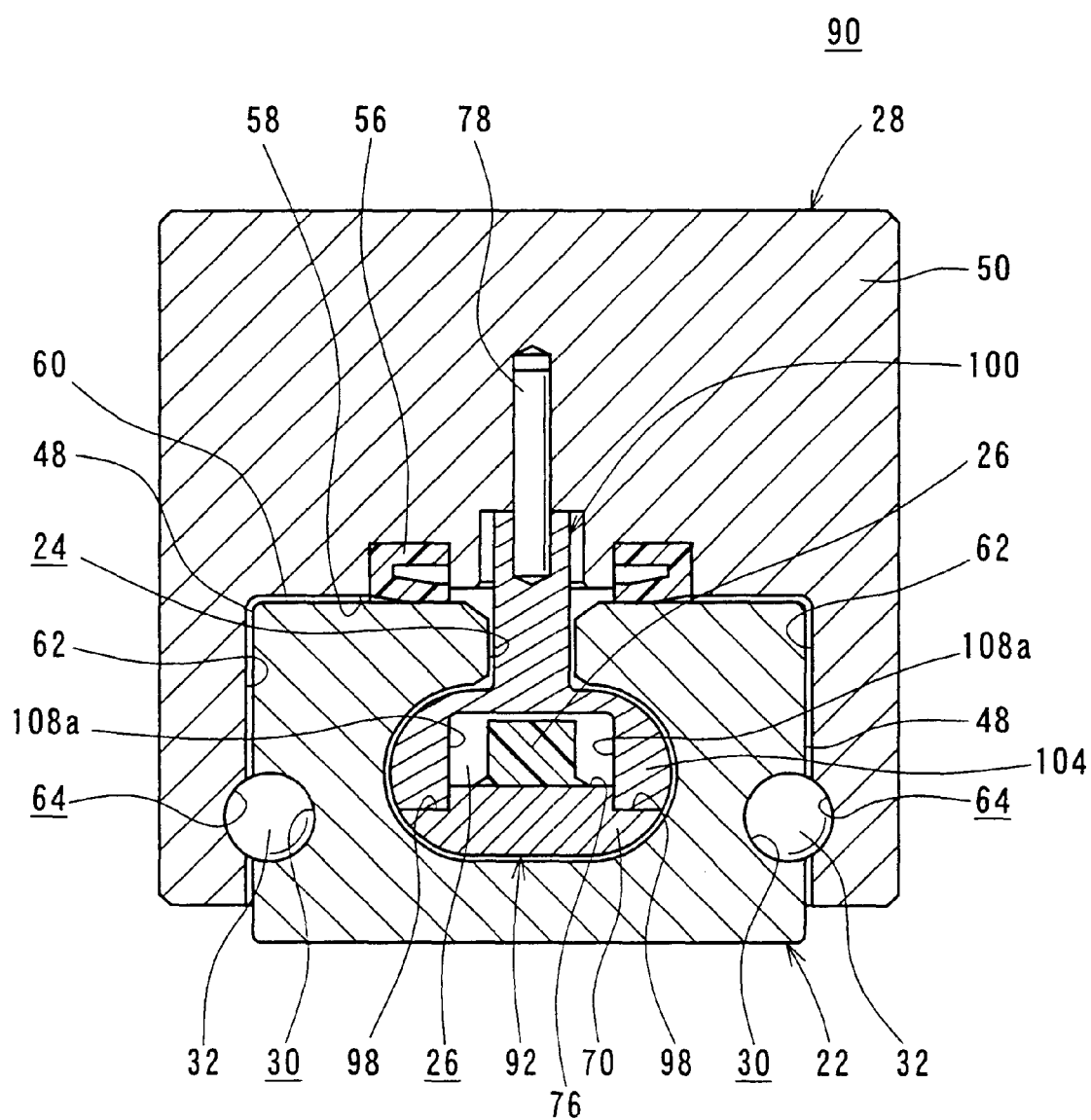
FIG. 9 shows a vertical sectional view taken along a line IX—IX shown in FIG. 8.
Figure 10:
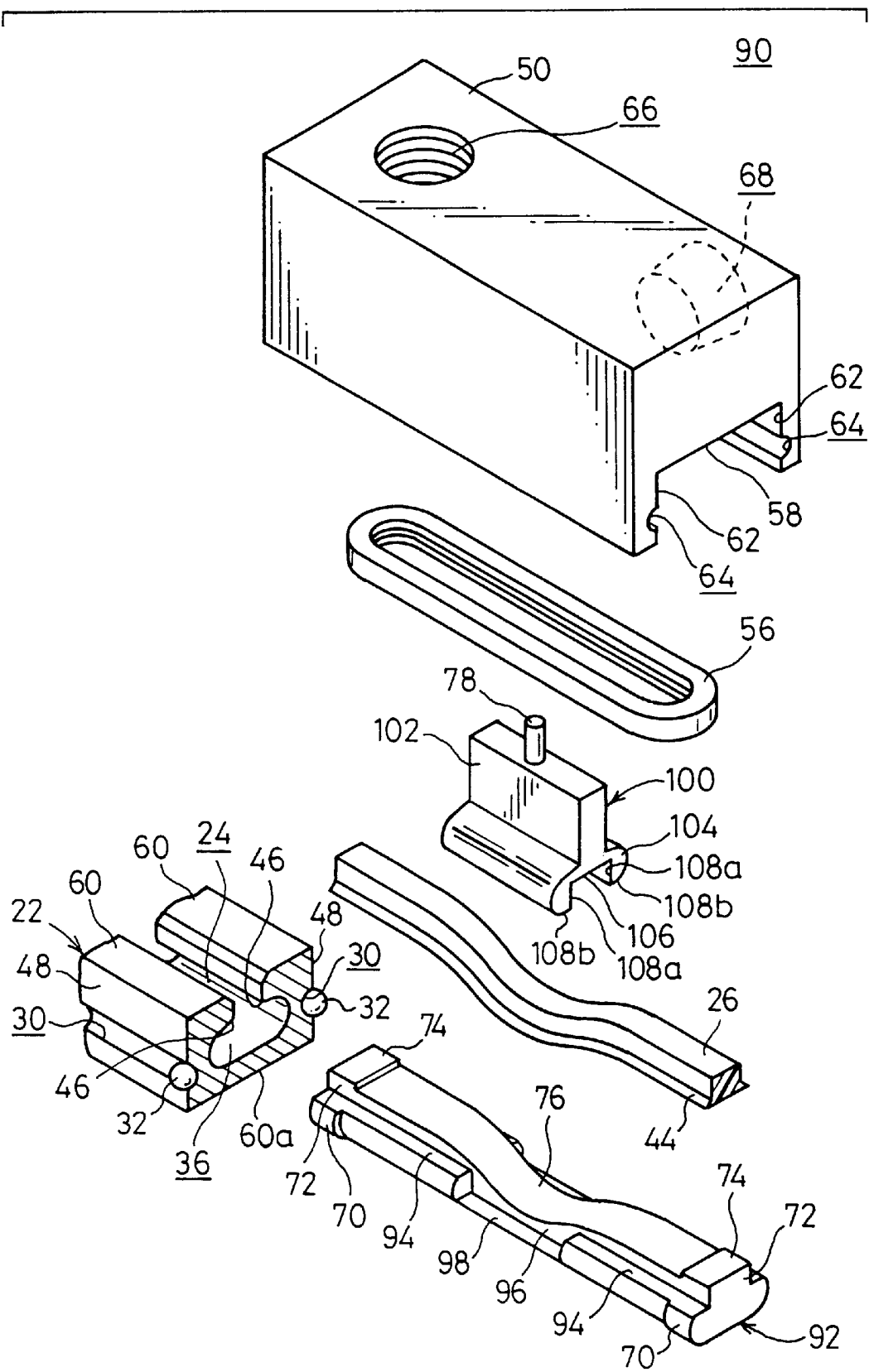
FIG. 10 shows, with partial omission, an exploded perspective view illustrating the fluid supply apparatus shown in FIG. 8.

Next, an arrangement of a fluid supply apparatus 90 according to a second embodiment of the present invention is shown in FIGS. 8 to 10. In the following embodiments, the same constitutive components of the fluid supply apparatus 90 as the constitutive components shown in FIGS. 1 to 7 described above are designated by the same reference numerals, detailed explanation of which will be omitted.

As shown in FIGS. 8 to 10, fastening surfaces 96, 98, to which a pressing mechanism 100 is installed, are provided at substantially central portions of an inner port cover 92. The pressing mechanism 100 comprises a guide piece 102 which is fastened to the ceiling surface 58 of the outer port cover 50 by the aid of the pin 78 and which is engaged with the opening 24 of the guide rail 22, and a holding section 104 which is formed integrally with the guide piece 102 and which is engaged with the fastening surfaces 96, 98 of the inner port cover 92 to fasten the seal belt 26 to the attachment surface 76 of the inner port cover 92. The holding section 104 has attachment surfaces 108a, 108b which abut against the fastening surfaces 96, 98 provided for the inner port cover 92 respectively.

In the fluid supply apparatus 90 according to the second embodiment, as shown in FIGS. 9 and 10, the holding section 104 of the pressing mechanism 100 is installed to face the attachment surface 76 of the inner port cover 92. The attachment surfaces 108a, 108b of the holding section 104 abut against the fastening surfaces 96, 98 respectively to guide the seal belt 26 so that the seal belt 26 is curved at the central portion of the attachment surface 76 of the inner port cover 92. As a result, the seal belt 26 is supported by the attachment surface 76 of the inner port cover 92, and the seal belt 26 makes sliding contact along the attachment surface 76. Therefore, it is possible to improve the durability of the seal belt 26.

Figure 11:
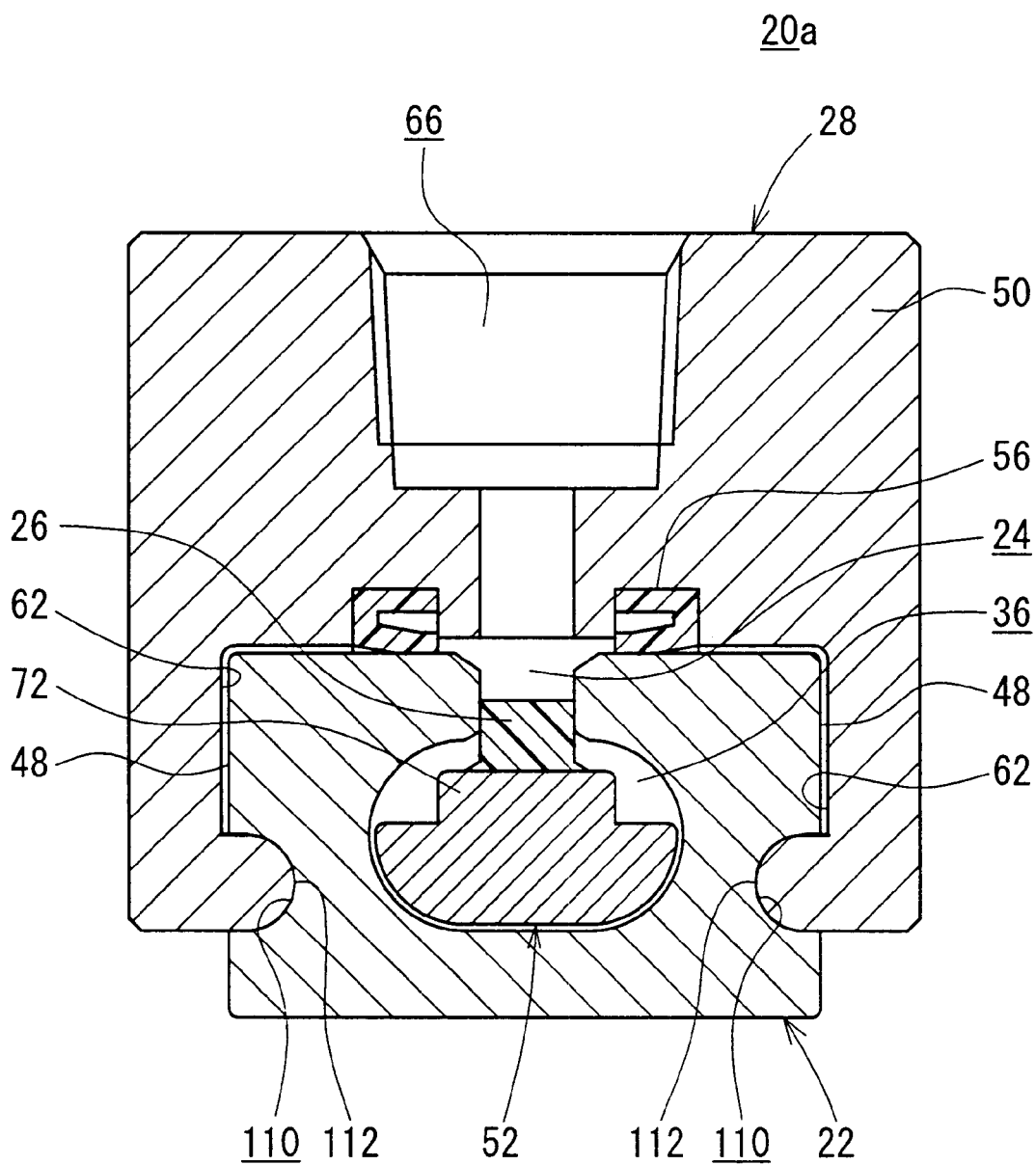
FIG. 11 shows a vertical sectional view illustrating an embodiment of sliding surfaces of a guide rail and an outer port cover.
Figure 12:
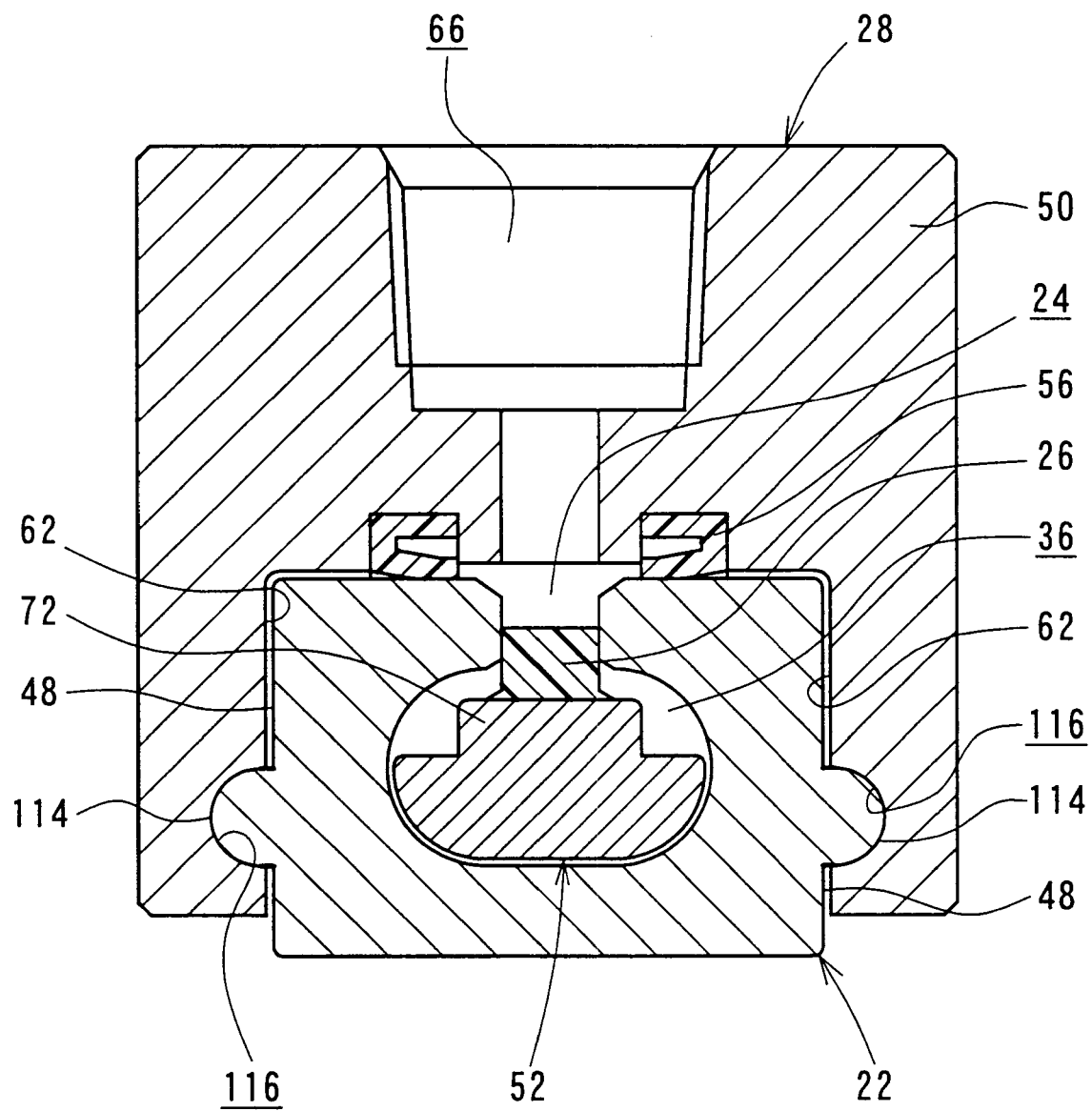
FIG. 12 shows a vertical sectional view illustrating another embodiment of sliding surfaces of a guide rail and an outer port cover.

FIGS. 11 and 12 show arrangements of fluid supply apparatuses 20a, 20b according to other embodiments in which concave/convex sliding surfaces are formed in place of the engagement between the rolling members 32 and the ball-rolling grooves 30, 64 as the load-absorbing mechanism of the fluid supply apparatus 20 according to the first embodiment.

The fluid supply apparatus 20a is shown in FIG. 11. Concave grooves 110, each of which has a curved surface, are bored on both outer side surfaces 48 of the guide rail 22 in the longitudinal direction. Projections 112, each of which is provided with a curved surface to slidably engage with the concave groove 110, are provided in the vicinity of the ends of the inner side surfaces 62 of the outer port cover 50 corresponding to the concave grooves 110. The projections 112 are engaged with the concave grooves 110, and thus the outer port cover 50 and the inner port cover 52 are successfully moved along the guide rail 22 in an integrated manner.

The fluid supply apparatus 20b is shown in FIG. 12. In this case, projections 114, each of which has a curved surface, are provided on both outer side surfaces 48 of the guide rail 22 in the longitudinal direction. Concave grooves 116, each of which has a curved surface to slidably engage with the projection 114, are provided in the vicinity of the ends of the inner side surfaces 62 of the outer port cover 50 corresponding to the projections 114.

In this arrangement, the concave grooves 110 and the projections 112 as well as the projections 114 and the concave grooves 116 are engaged with each other by means of the surface-to-surface contact respectively. Therefore, when the outer port cover 50 is moved along the guide rail 22 without any jolting. Thus, the outer port cover 50 can be stably moved.

Figure 13:
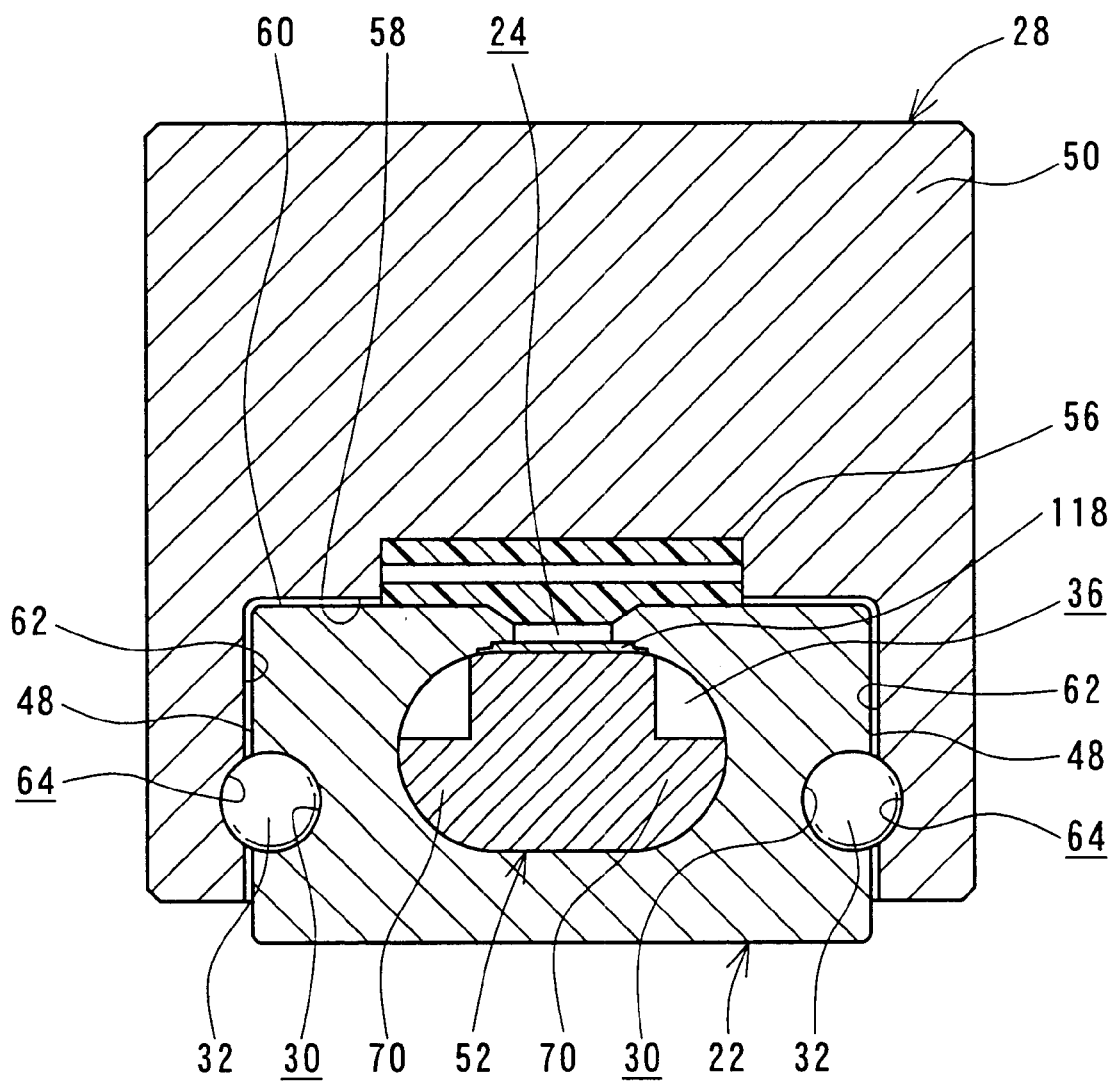
FIG. 13 shows a vertical sectional view illustrating an embodiment in which a seal belt made of stainless steel is used in place of a seal belt made of resin.

FIG. 13 shows a fluid supply apparatus 20c according to an embodiment in which the opening 24 of the guide rail 22 is closed with a seal belt 118 which is a band-shaped member made of stainless steel, in place of the seal belt 26 made of the resin material as shown in FIGS. 1 to 7.

The seal belt 118 closes the opening 24 of the guide rail 22 from the side of the fluid supply passage 36. The both ends of the seal belt 118 are fixed by applying appropriate tension to the pair of end covers 34 (see FIG. 1).

In this embodiment, the seal belt 118 has a thin thickness to make engagement with the opening 24 disposed over the fluid supply passage 36. Therefore, the size of the guide rail 22 in the vertical direction is relatively small so that the volume of the fluid supply passage 36 can be downsized. Thus, the weight of the guide rail 22 can be reduced, and the size thereof can be miniaturized. Further, the port block 28 can be smoothly moved, because the sliding friction between the inner port cover 52 and the pressing mechanism 54 is small.

Figure 14:
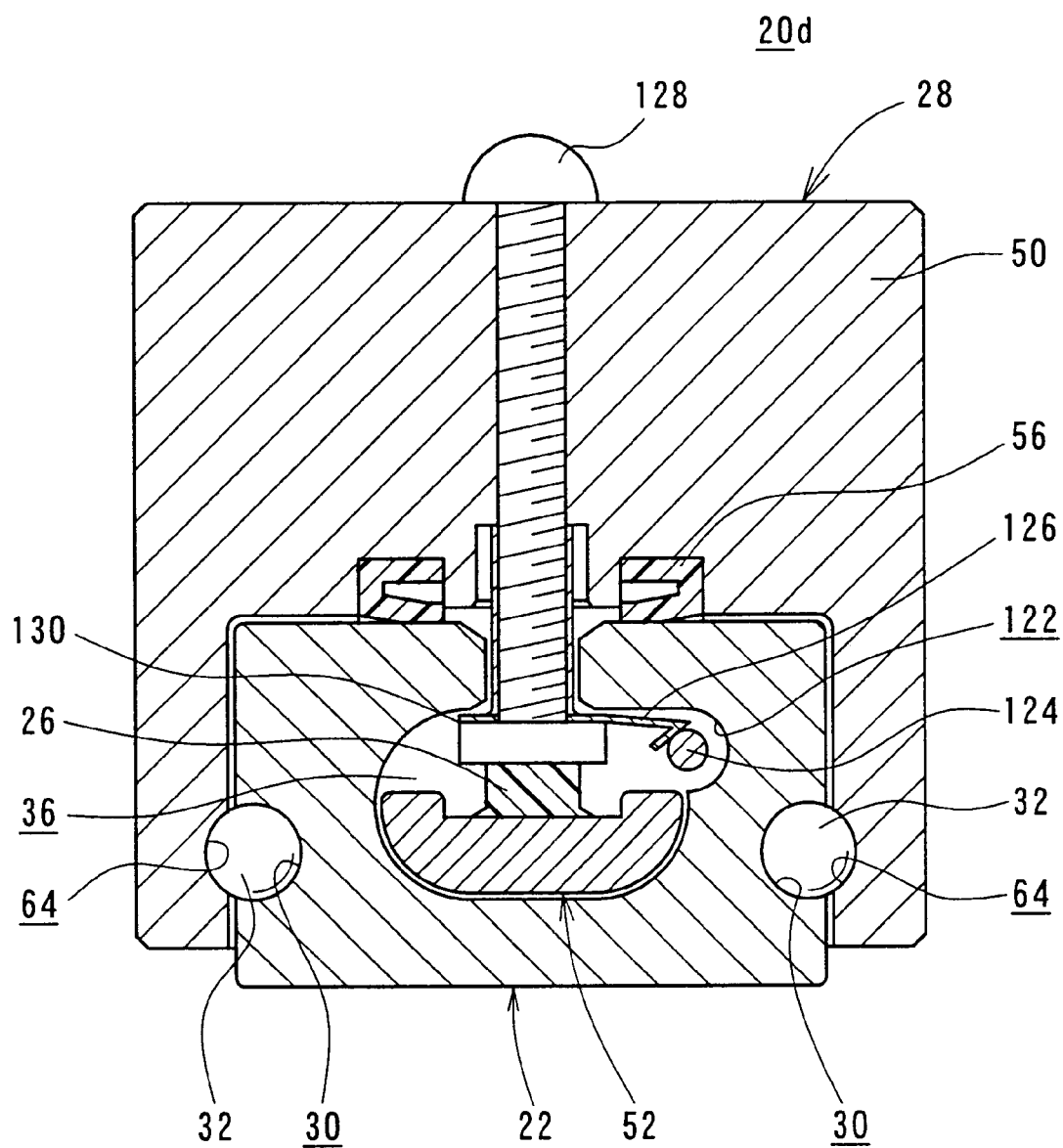
FIG. 14 shows a vertical sectional view illustrating an embodiment in which a steel wire is stretched in a fluid supply passages of a guide rail.

FIG. 14 shows a fluid supply apparatus 20d according to an embodiment in which a conductive wire is contained.

A conductive wire, for example, a steel wire 124, which has both ends fixed by the end covers 34 (see FIG. 1), is additionally provided in a recess 122 disposed at an upper portion of the fluid supply passage 36 of the guide rail 22. Further, a sliding tab 126, which makes sliding contact with the steel wire 124 and which is movable together with the outer port cover 50, is provided in the fluid supply passage 36. The sliding tab 126 is attached to the forward end of a conductive bolt 128 which is screw-fastened to the outer port cover 50, by the aid of an insulating member 130. The sliding tab 126 is engaged with the steel wire 124, and it is electrically connected therewith. Further, the sliding tab 126 has such a function that the steel wire 124 is prevented from swinging movement during the movement of the outer port cover 50.

In the fluid supply apparatus 20d according to this embodiment, the current, which flows through the steel wire 124, is extracted by the bolt 128 which is displaced integrally with the outer port cover 50. The current is used, for example, for the power source for a control apparatus (not shown).

Figure 15:
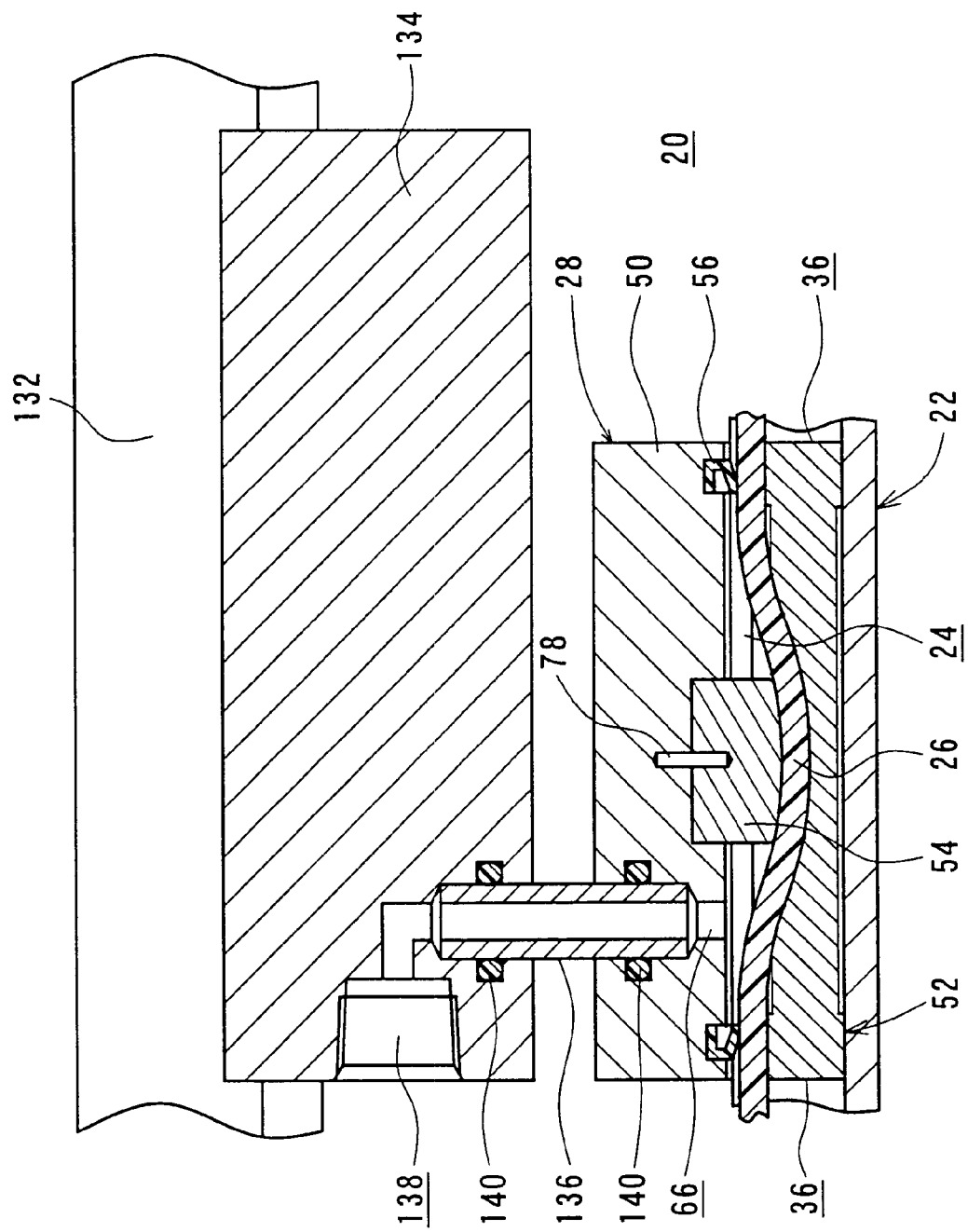
FIG. 15 shows, with partial omission, an embodiment in which an actuator or the like is directly connected to the fluid supply apparatus.

FIG. 15 shows an embodiment in which the fluid supply apparatus 20 is directly connected to a driving apparatus, for example, an actuator such as a rodless cylinder. A main joint body 134, which is integrally attached to a movable member 132 of the actuator, is connected to the outer port cover 50 of the fluid supply apparatus 20 by the aid of a rigid joint 136. One end of the joint 136 is connected to the outlet port 66 of the fluid supply apparatus 20, and the other end of the joint 136 is connected to a supply passage 138 bored in the main joint body 134. The joint 136 is sealed by seal members 140 which are installed to the main joint body 134 and the joint 136 respectively. The supply passage 138 is connected to a fluid inlet/outlet port defined in a cylinder tube of an unillustrated rodless cylinder, for example.

In the embodiment shown in FIG. 15, the fluid supply apparatus 20 follows the operation of the movable member 132 by the aid of the joint 136 in accordance with the driving operation of the actuator. The fluid in the fluid supply apparatus 20 can be supplied to the actuator from the supply passage 138 by the aid of the main joint body 134 during the movement of the movable member 132. Therefore, the piping is simplified, and the piping distance is shortened. Thus, it is possible to decrease the piping resistance.

Figure 16:
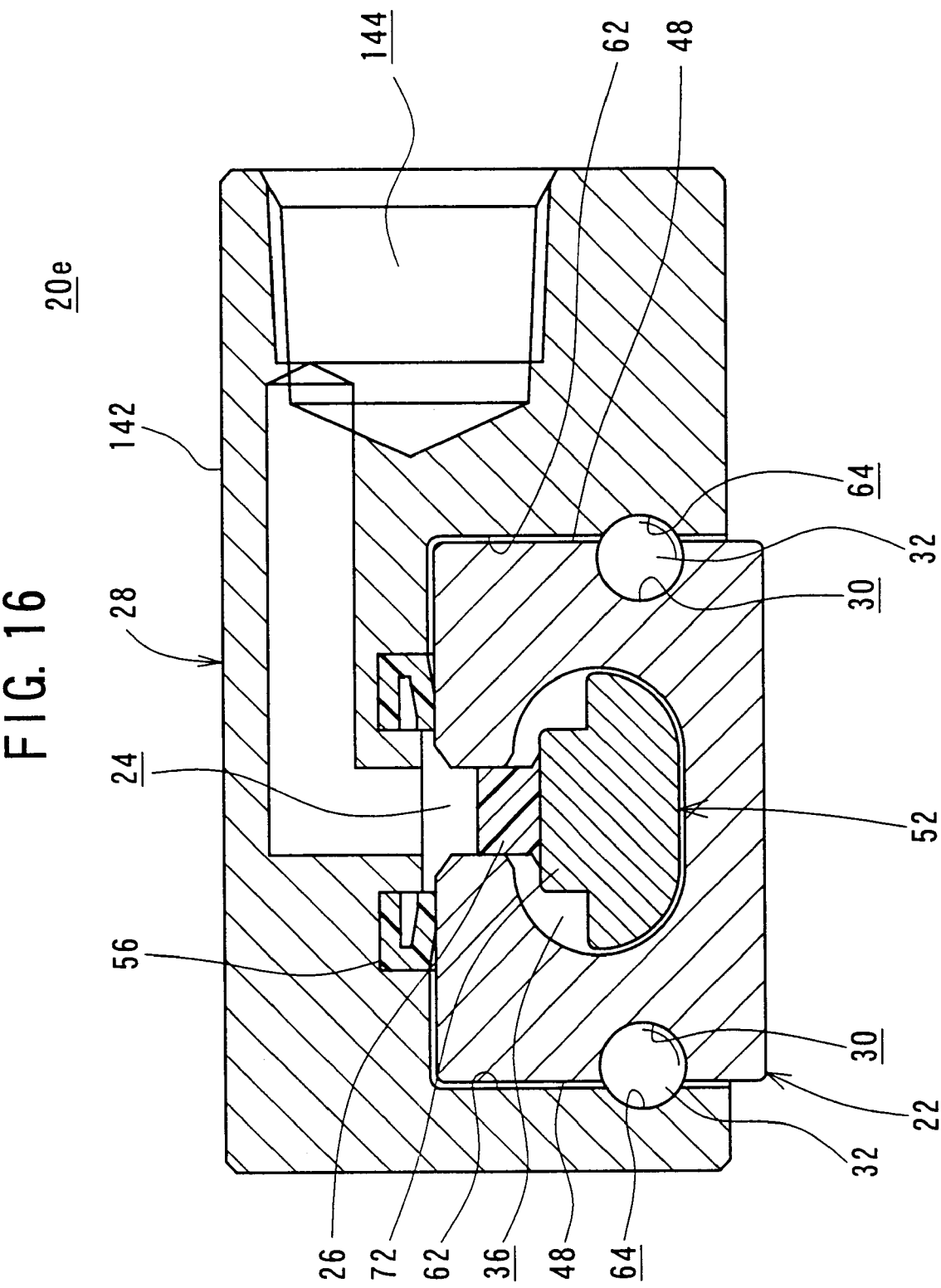
FIG. 16 shows a vertical sectional view illustrating another embodiment of an outer port cover.

FIG. 16 shows an arrangement of a fluid supply apparatus 20e according to an embodiment in which an outlet port 144, which is provided for an outer port cover 142, is bored in a direction substantially perpendicular to the displacement direction along the guide rail 22.

In the fluid supply apparatus 20e shown in FIG. 16, when the outer port cover 142 is assembled to the guide rail 22, it is possible to make the height in the vertical direction of the outer port cover 142 to be low. Therefore, the fluid supply apparatus 20e is advantageous in that the attachment space is reduced when the fluid supply apparatus 20e is directly connected to another driving apparatus as shown in FIG. 15 described above.

A fluid supply apparatus 150 according to a third embodiment of the present invention will be explained with reference to FIG. 17. A pair of openings 154 and a pair of fluid supply passages 156 are formed substantially in parallel respectively on identical horizontal surfaces in a direction substantially perpendicular to the vertical direction on both outer side surfaces 48 of a guide rail 152. An outer port cover 158, which is provided displaceably along the guide rail 152, is installed at its inner side surfaces with a pair of seal belts 160 which are engaged with the opening 154. A pair of outlet ports 162 for supplying the fluid to the outside are provided in a substantially vertical direction at an upper surface of the outer port cover 158.

The fluid supply apparatus 150 according to the third embodiment is basically constructed as described above. The fluid passes from a plurality of, for example, two of the fluid supply passages 156 via the outlet ports 162. The fluid is supplied, for example, two external unillustrated actuators. Therefore, it is possible to further increase the number of objects to which the fluid is supplied.

Figure 17:
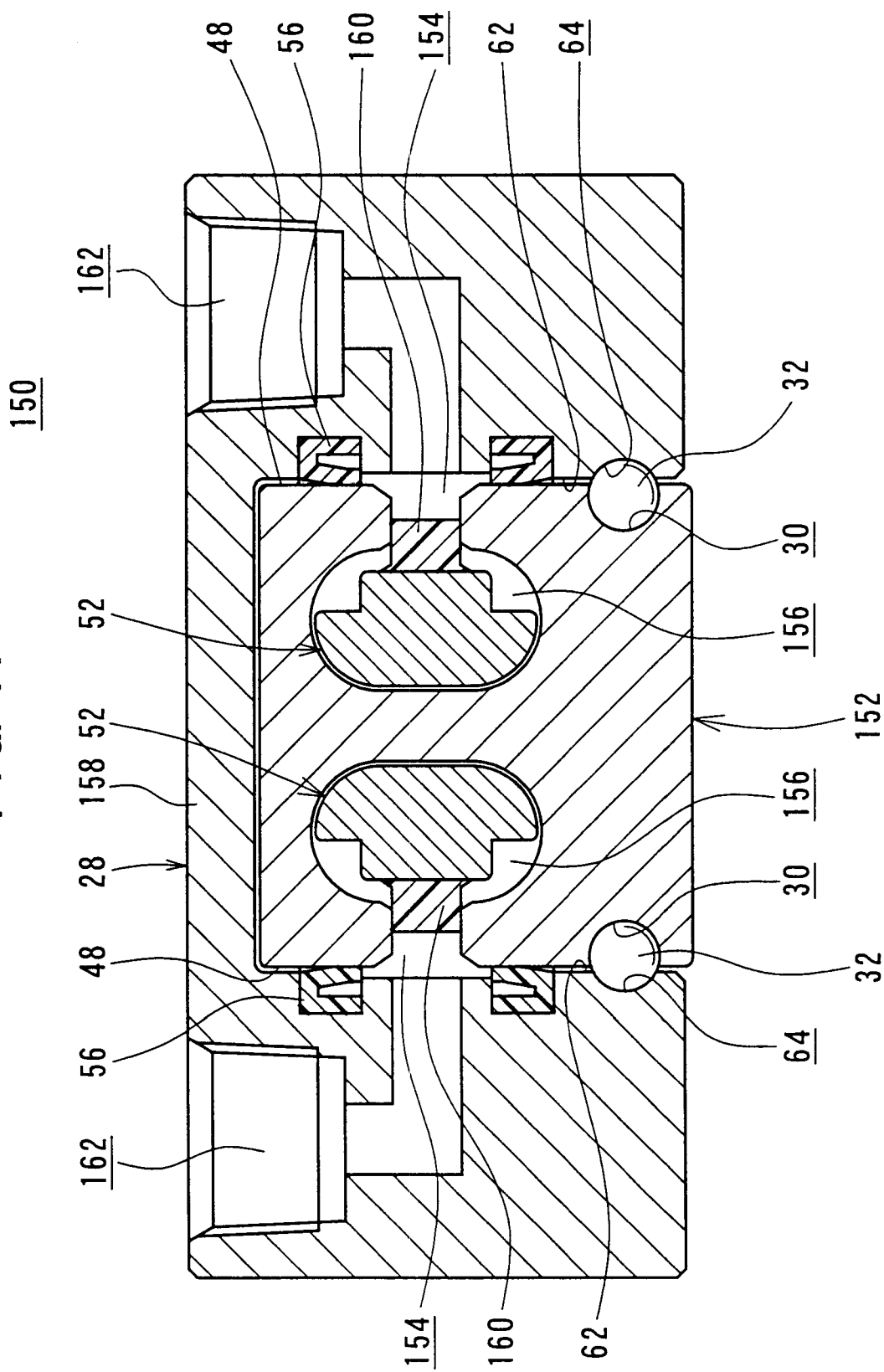
FIG. 17 shows a vertical sectional view illustrating a fluid supply apparatus according to a third embodiment of the present invention.
Figure 18:
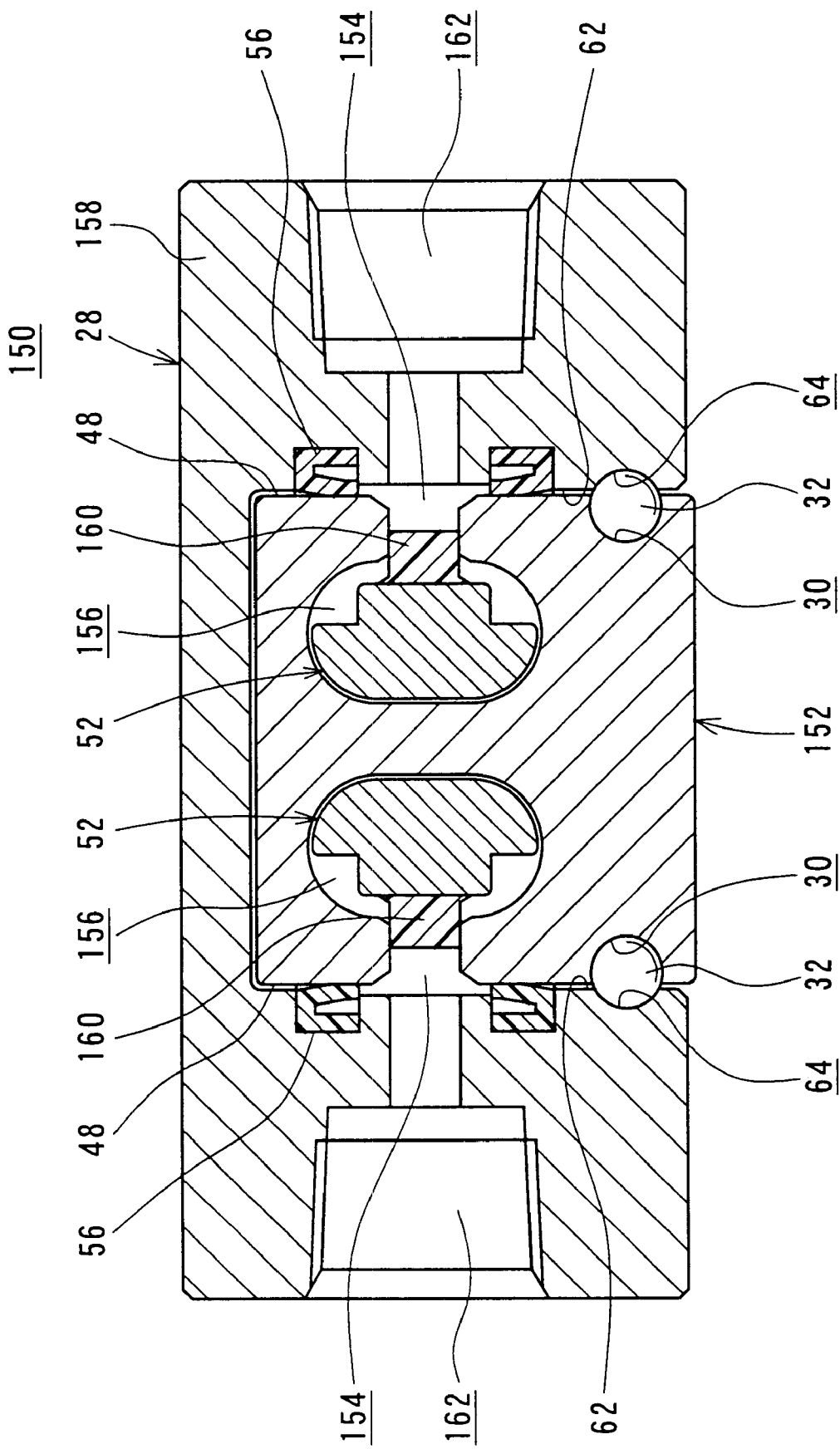
FIG. 18 shows a vertical sectional view illustrating another embodiment of an outlet port.
Figure 19:
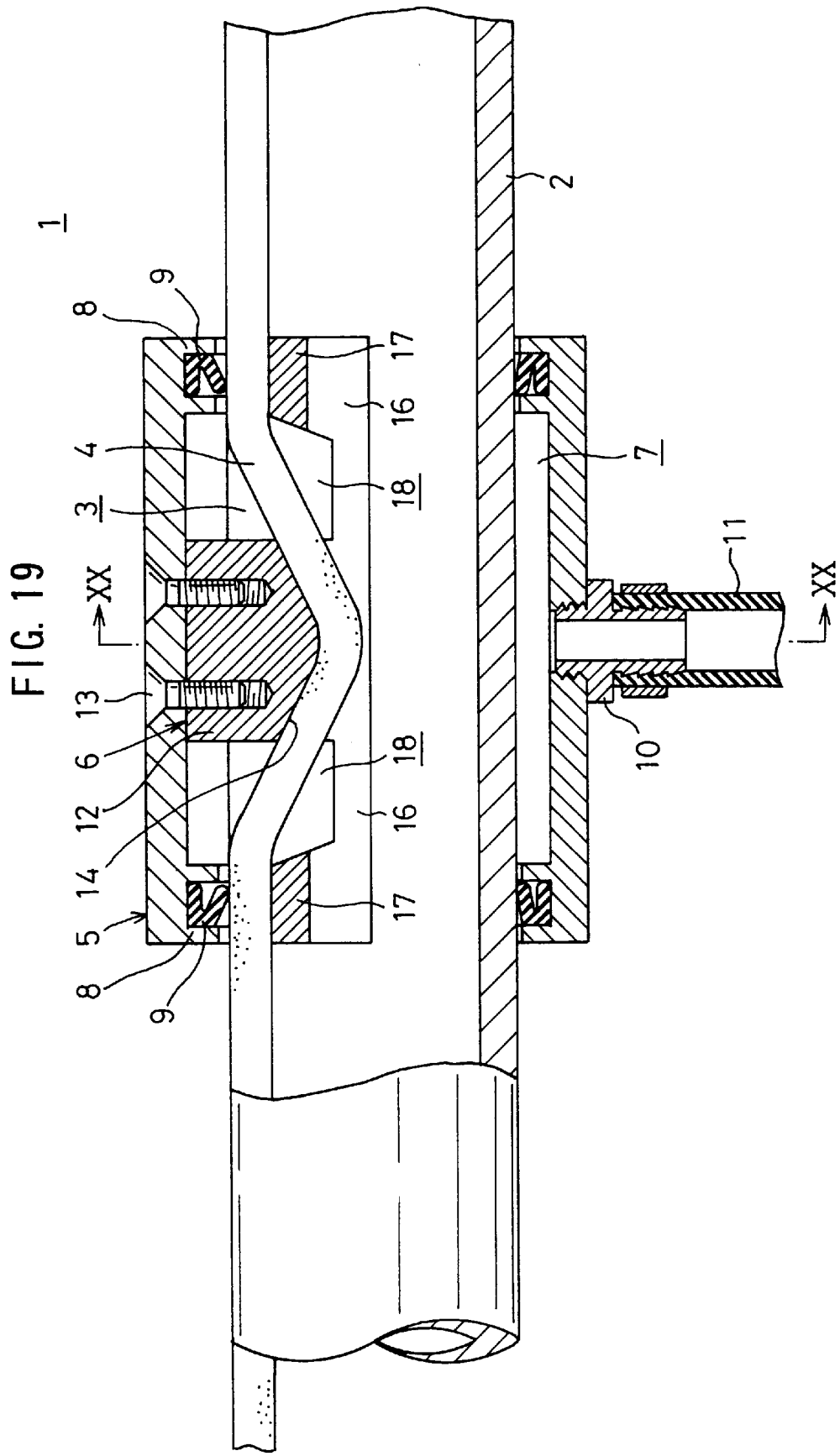
FIG. 19 shows, with partial omission, a longitudinal sectional view taken along the axial direction of a conventional slide joint.
Figure 20:
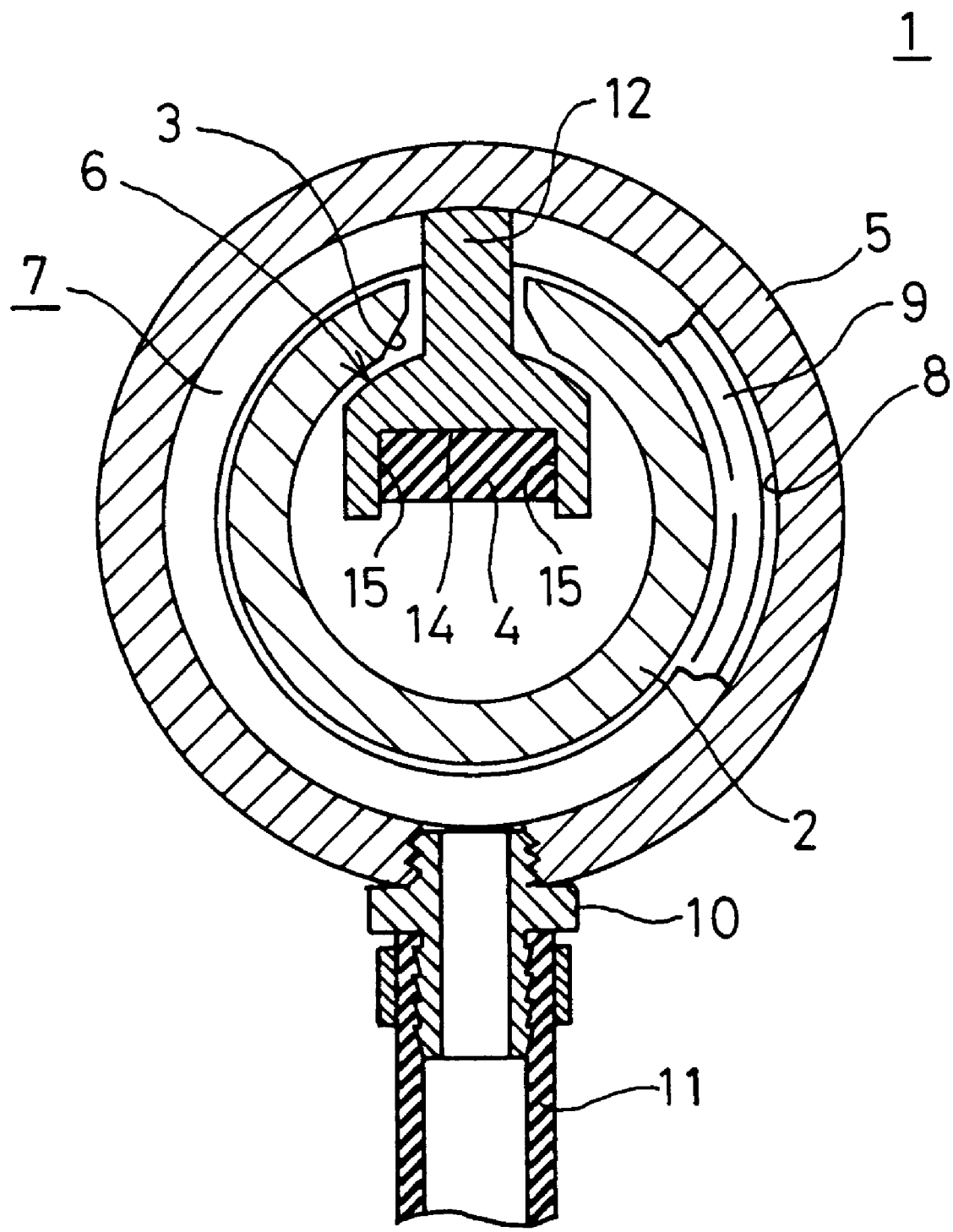
FIG. 20 shows a vertical sectional view taken along a line XX—XX shown in FIG. 19.

FIG. 18 shows another embodiment in which a pair of outlet ports 162 as provided for the fluid supply apparatus 150 shown in FIG. 17 are bored through an outer port cover 158 in a substantially horizontal direction.

Those illustrated in FIGS. 11 to 16 have been explained as exemplified by the form which is applied to the first fluid supply apparatus 20. However, these embodiments are also applicable to the second fluid supply apparatus 90.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fluid supply apparatus comprising:
   a guide rail having a substantially rectangular cross section which is formed with a fluid supply passage in a longitudinal direction and which is provided with an opening for making communication between said fluid supply passage and the outside;
   a seal belt for closing said opening of said guide rail;
   an outer port cover which is formed with an outlet port communicating with said opening and which is provided displaceably in said longitudinal direction of said guide rail while making engagement with said seal belt;

an inner port cover which is installed in said fluid supply passage of said guide rail, which is provided with a curved surface disposed at a substantially central portion, and which is provided to make displacement integrally with said outer port cover;

a seal member which is interposed between said guide rail and said outer port cover, for surrounding said opening of said guide rail; and a pressing mechanism which is installed between said outer port cover and said inner port cover, for pressing said seal belt so that said seal belt is curved, wherein:
said seal belt is pressed and curved toward said inner port cover by said pressing mechanism, and thus said opening is opened to make communication between said fluid supply passage and said outlet port.

2. The fluid supply apparatus according to claim 1, further comprising a load-absorbing mechanism for making engagement between said guide rail and said outer port cover and absorbing a load applied to said outer port cover.

3. The fluid supply apparatus according to claim 2, wherein said load-absorbing mechanism includes rolling members rollably fitted between a groove which is provided on an outer side surface of said guide rail and a groove which is formed on an inner side surface of said outer port cover.

4. The fluid supply apparatus according to claim 1, wherein said seal member is provided to surround a part of said opening corresponding to a portion of said outer port cover.

5. The fluid supply apparatus according to claim 1, wherein said pressing mechanism includes a pin which is provided on a first side to be installed to an inner surface of said outer port cover, and a curved surface which is provided on a second side to be engaged with said seal belt.

6. The fluid supply apparatus according to claim 1, wherein said pressing mechanism includes a pin which is provided on a first side to be installed to an inner surface of said outer port cover, and a holding section having an attachment surface which is provided on a second side to be engaged with said seal belt and make abutment against a fastening surface of said inner port cover.

7. The fluid supply apparatus according to claim 1, wherein said seal belt is formed so that said seal belt is curved at a substantially central portion in said longitudinal direction of said inner port cover.

8. The fluid supply apparatus according to claim 1, wherein an attachment surface for fixing said fluid supply apparatus to another member is provided on said guide rail.

9. The fluid supply apparatus according to claim 1, wherein a pair of guide sections, which make sliding contact with an inner wall surface of said fluid supply passage, are formed at both ends in an axial direction of said inner port cover.

10. The fluid supply apparatus according to claim 1, wherein a pair of openings and a pair of fluid supply passages are formed substantially in parallel in said guide rail, and a pair of seal belts for closing said openings respectively and a pair of inner port covers for making sliding movement along said fluid supply passages are provided respectively.

11. The fluid supply apparatus according to claim 1, wherein said seal belt is formed of a resin material.

12. The fluid supply apparatus according to claim 1, wherein said seal belt is formed of a metal material.

13. The fluid supply apparatus according to claim 1, wherein a conductive wire is stretched along said fluid supply passage in said guide rail, and a conductive member, which is electrically connected to said conductive wire, is provided displaceably integrally with said outer port cover.

* * * * *